United States Patent [19]
Corrigan, III et al.

[11] Patent Number: 5,986,239
[45] Date of Patent: Nov. 16, 1999

[54] CONDUCTIVE WARMER FOR FOAM PACKAGING BAGS

[75] Inventors: John Joseph Corrigan, III, Washington, Conn.; Eric Alvin Kane, Lynn, Mass.

[73] Assignee: Sealed Air Corporation, Danbury, Conn.

[21] Appl. No.: 09/042,104

[22] Filed: Mar. 13, 1998

[51] Int. Cl.[6] ............................... H05B 3/32; H05B 1/02
[52] U.S. Cl. ..................... 219/385; 219/214; 219/428; 219/475; 222/146.5; 221/150 A
[58] Field of Search .................. 219/214, 385, 219/386, 387, 428, 475, 430, 439; 221/92, 150 A; 222/146.5; 392/445

[56] References Cited

U.S. PATENT DOCUMENTS

| | | | |
|---|---|---|---|
| 1,583,101 | 5/1926 | Ricks | 34/202 |
| 1,977,608 | 10/1934 | Blystone | 62/350 |
| 2,112,263 | 3/1938 | Bohannon et al. | 62/350 |
| 2,293,764 | 8/1942 | Roeder | 219/214 |
| 2,730,608 | 1/1956 | Axelsson | 219/428 |
| 3,038,058 | 6/1962 | Gordon | 219/508 |
| 3,454,318 | 7/1969 | Kemp et al. | 219/214 |
| 3,544,762 | 12/1970 | Eisler | 219/200 |
| 3,632,968 | 1/1972 | Wilson | 219/214 |
| 4,036,401 | 7/1977 | Nachtigall, Jr. | 221/150 A |
| 5,185,939 | 2/1993 | Kimura | 34/105 |
| 5,582,754 | 12/1996 | Smith et al. | 219/438 |
| 5,880,434 | 3/1999 | Pinnow et al. | 219/386 |

*Primary Examiner*—Jospeh Pelham
*Attorney, Agent, or Firm*—Alston & Bird LLP

[57] ABSTRACT

A conductive warmer for flexible plastic bags containing foam precursor chemicals includes a heat-conducting member of thermally conductive material having a plurality of fins which are parallel and spaced apart to define a plurality of spaced-apart bag-receiving compartments. The fins are connected to a back portion of the heat-conducting member, to which a heating element is attached in heat-exchanging relationship. Operation of the heating element conducts heat through the back portion and the fins of the heat-conducting member to the bags. The heat-conducting member is contained within a housing having an opening providing access to the open side of the compartments. The housing preferably is formed in two portions, a first portion containing the heat-conducting member and a second portion supporting the first portion, the first and second portions being pivotally interconnected to allow selective variation of the angular orientation of the first portion with respect to the second portion.

14 Claims, 2 Drawing Sheets

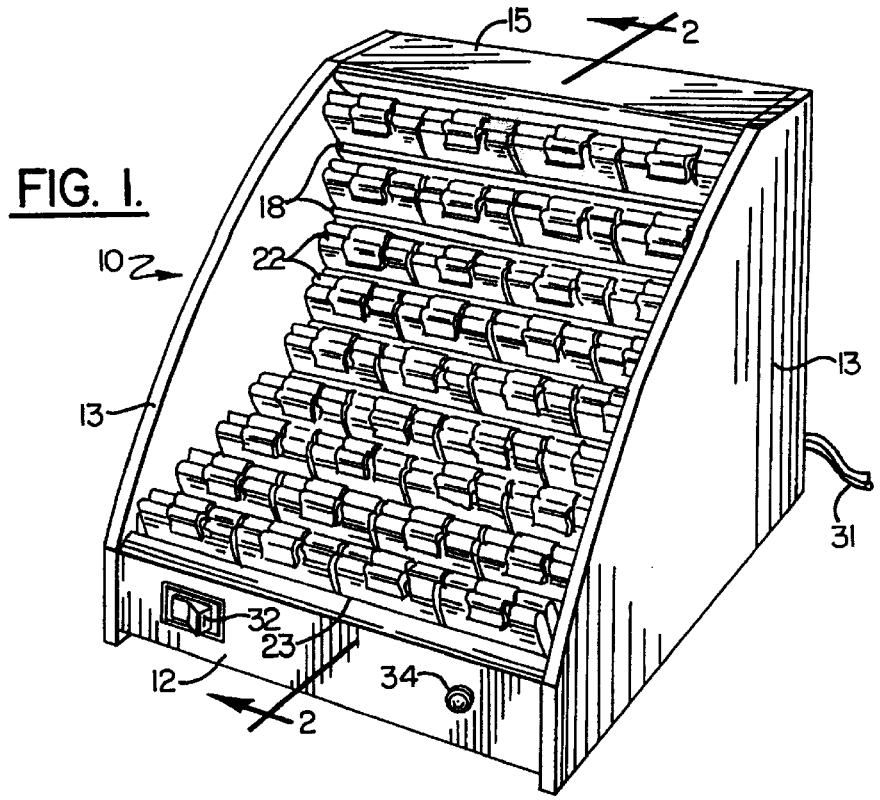
FIG. 1.
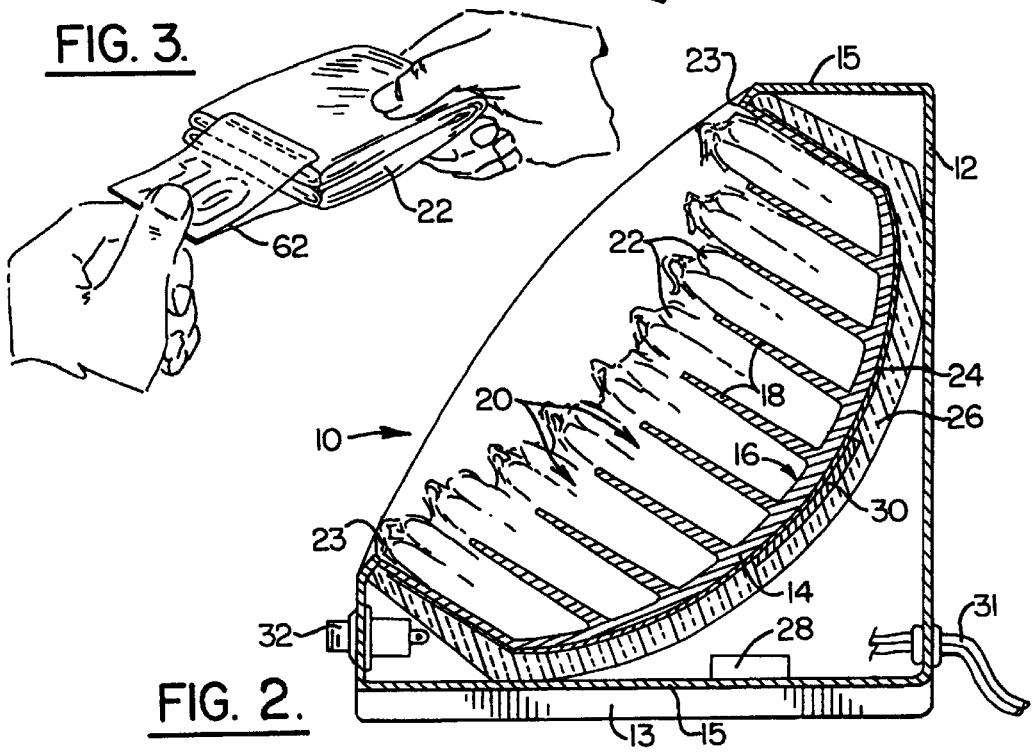
FIG. 3.
FIG. 2.

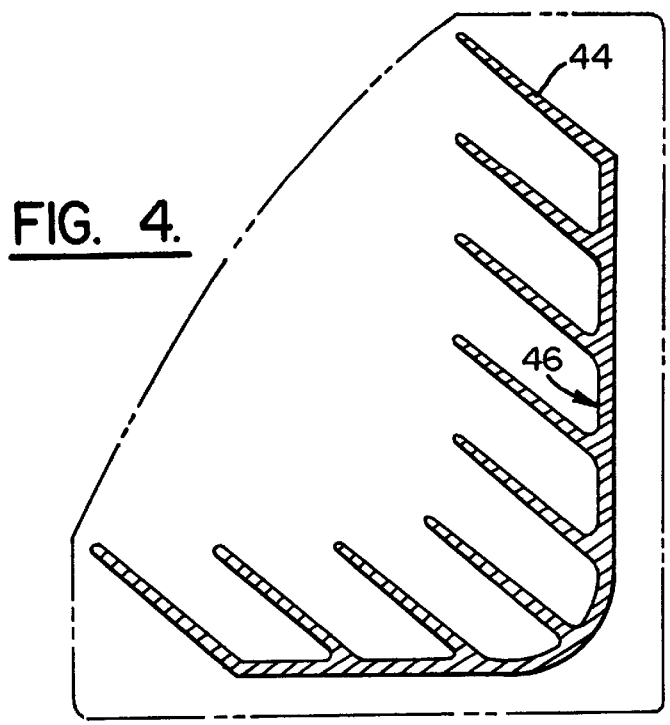
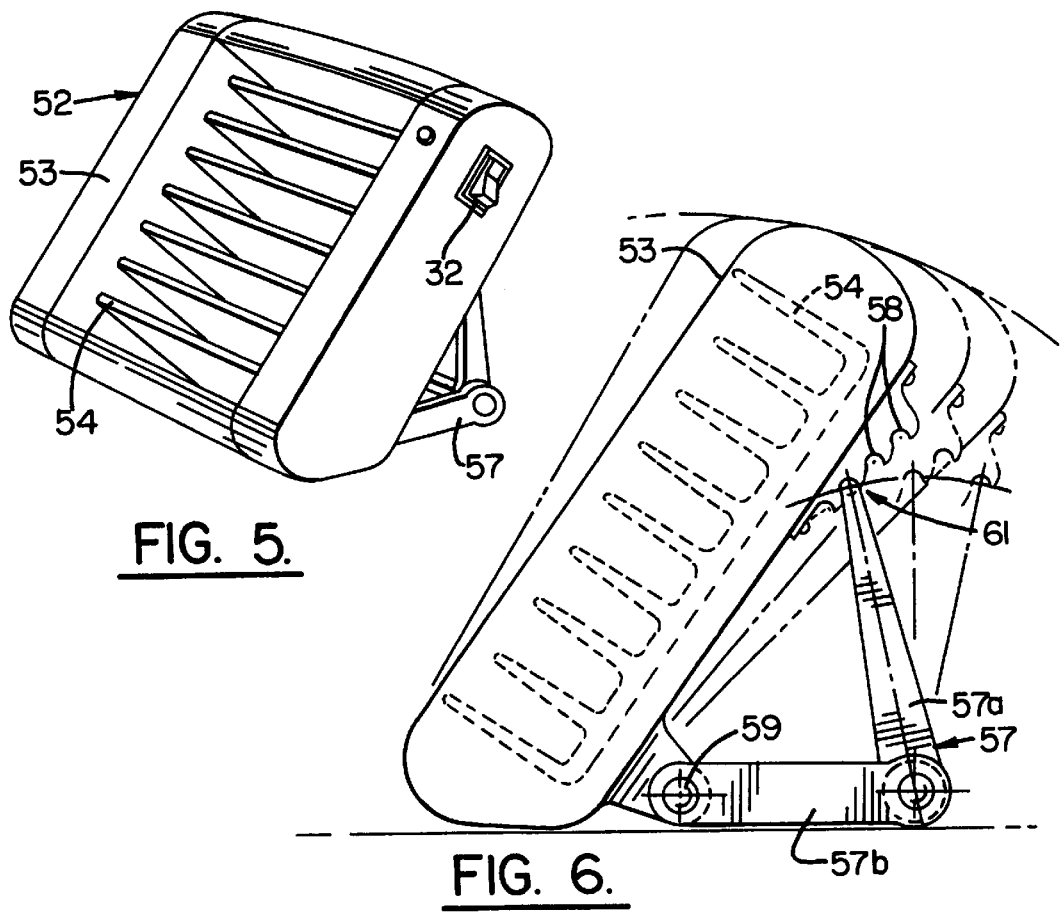

CONDUCTIVE WARMER FOR FOAM PACKAGING BAGS

FIELD OF THE INVENTION

The present invention relates to a conductive warmer for articles and, more particularly, to a conductive warmer for flexible plastic bags which contain foam-producing precursor chemicals.

BACKGROUND OF THE INVENTION

Foam-in-place packaging is a known technique for producing cushioning packaging for fragile articles which are to be shipped. Foam-in-place packaging comprises generating foam cushioning on an as-needed basis while the article to be protected is being packaged. In general, foam-in-place packaging employs foamable compositions which are produced by bringing together two or more precursor chemicals that react and form foam when mixed together. The chemicals are generally selected from among those chemicals which when mixed form polymeric foams that harden upon curing. For example, a liquid polyol-containing precursor and a liquid isocyanate-containing precursor may be mixed and reacted to form a polyurethane foam. The resulting foam occupies a volume which is many times the volume of the liquid precursors.

One technique for foam-in-place packaging is to place the article to be packaged in a container, and then to place one or more flexible plastic bags containing a foamable composition into the container. The foamable composition expands to cause the bag to fill the void space between the walls of the container and the article, and then hardens. The result is a foam cushion that conforms closely to the shape of the article and the container, and thereby cushions and protects the article. This technique is generally referred to as the foam-in-bag technique.

A number of automated devices have been developed for rapidly making a relatively large number of bags for foam-in-bag packaging, and are assigned to the assignee of the present application. Exemplary devices are described and claimed in U.S. Pat. Nos. 4,674,268; 4,800,708; 4,854,109; and 5,376,219. Because these devices mix the precursors together as they are placed in the bags, the resulting bags must be placed in the containers with the articles immediately. Accordingly, these devices are particularly suitable for use in situations where it is desirable and feasible to make the bags containing the foam precursors at the location where articles are being packaged.

However, in certain applications, it may not be desirable to employ such automated devices to make foam-in-bag packaging directly at the packaging location. Accordingly, the assignee of the present application has developed a bag for foam-in-bag packaging use in which the precursor chemicals are contained in a bag and kept separated from one another until it is desired to form a foam cushion from the bag. At that time, the bag may be manipulated to cause breakage of a frangible membrane that separates the two precursors and to mix the precursors together. The bag is then placed into the packaging container adjacent the article to be protected. The precursors react to form foam, and the bag expands to fill the void space and cures to form a cushion. The bag is described and claimed in co-pending U.S. patent application Ser. No. 09/042,444, entitled "Foam In Bag Packaging System nd Method for Producing the Same" and filed concurrently herewith now issued as U.S. Pat. No. 5,899,325, which is assigned to the assignee of the present application, and the disclosure of which is incorporated herein by reference.

It will be appreciated that the volume of foam produced in the bag is influenced by a number of parameters, including the masses of the two precursors, the ratio of the masses, and the temperature of the precursors. Additionally, the speed of the foam-forming reaction depends on the temperature of the precursors, generally increasing with increasing temperature. The masses of the precursors and their ratio can be accurately controlled in manufacturing the bag. However, the temperature of the precursors is influenced by the environment in which the bags are kept prior to use. It will be appreciated that without some means of controlling the temperature of the bags, variability in temperature will occur and result in inconsistent foam expansion from one application to another, with resultant inconsistency in packaging characteristics.

SUMMARY OF THE INVENTION

The present invention was developed to overcome the problem of temperature variability in foam-in-bag packaging bags of the type described in the aforementioned U.S. Pat. No. 5,899,325. The invention comprises a conductive warmer configured to receive a plurality of bags in their unexpanded state prior to the precursors being brought together. The warmer conductively transfers heat to the bags to elevate their temperature above normal room temperature and then maintain the temperature substantially constant at a predetermined elevated temperature. The bags are used after they have reached the predetermined temperature, thus helping to assure consistent foam expansion from one bag to another and from one packaging application to another.

More particularly, the warmer includes a heat-conducting member having a plurality of spaced-apart compartments into which the bags are placed. A heating element is disposed in heat-exchanging relationship with the heat-conducting member and is operable to heat the heat-conducting member for conduction of heat to the bags. Advantageously, the heating element raises the temperature of the heat-conducting member to a predetermined elevated temperature, and a temperature control unit controls operation of the heating element to maintain the temperature of the heat-conducting member substantially constant at the predetermined temperature Preferably, the warmer further includes a housing that contains the heat-conducting member and the heating element. Advantageously, thermal insulation is disposed between the heat-conducting member and the housing. The housing includes an opening providing access to the compartments. In one preferred embodiment, the housing includes a first portion containing the heat-conducting member and the heating element, and a second portion adapted to support the warmer. The first and second portions are pivotally interconnected to permit the orientation of the first portion to be selectively varied with respect to the second portion, thereby selectively varying the orientation of the compartments. A locking mechanism is provided for fixing the first and second portions in a selected relative orientation.

The heat-conducting member advantageously has a back portion from which a plurality of fins project and to which the fins are connected in heat-conductive relationship. The fins are spaced apart to define the compartments for receiving bags. The heat-conducting member advantageously is integrally formed of one piece of thermally conductive material, preferably being extruded from aluminum.

BRIEF DESCRIPTION OF THE DRAWINGS

Additional objects, features, and advantages of the invention will become apparent from the following description of particular embodiments thereof, taken in conjunction with the accompanying drawings in which:

FIG. 1 is a perspective view of a warmer in accordance with a first embodiment of the present invention having a generally C-shaped heat-conducting member, and showing the warmer loaded with a supply of bags to be warmed;

FIG. 2 is a cross-sectional view taken on line 2—2 of FIG. 1;

FIG. 3 is perspective view of one of the bags, showing a user grasping the bag in preparation for using the bag to form a cushion;

FIG. 4 is a cross-sectional view similar to FIG. 2, showing a second embodiment of the invention which employs an alternative L-shaped configuration for the heat-conducting member;

FIG. 5 is a perspective view of a third embodiment of the invention which permits selective adjustment of the orientation of the warmer; and FIG. 6 is a side elevational view of the warmer of FIG. 5, showing the operation of one illustrative mechanism which permits adjustment of the orientation of the warmer.

DETAILED DESCRIPTION OF THE DRAWINGS

With reference to FIGS. 1–2, a warmer in accordance with a first embodiment of the invention is broadly indicated by the reference numeral 10. The warmer 10 includes a housing 12 and a heat-conducting member 14 contained in the housing 12. The heat-conducting member 14 comprises a back portion 16 and a plurality of fins 18 which project from and are connected to the back portion 16 in heat-conductive relationship therewith. The fins 18 are generally parallel to one another and are spaced apart to define a plurality of compartments 20 for receiving bags 22. The housing 12 includes an opening 23 which provides access to the compartments 20. The spacing between the fins 18 is selected to accommodate the thickest bag expected to be inserted, it being understood that the bags may be made in a variety of sizes having various thicknesses. Each compartment 20 is defined by two adjacent fins 18 and extends transversely along the length of the heat-conducting member 14. The heat-conducting member 14 is advantageously of sufficient length so that more than one bag may be placed side-by-side in a given compartment 20 at the same time, as shown in FIG. 1. The heat-conducting member 14 shown in FIGS. 1–2 has nine fins 18 defining eight compartments 20, but it will be appreciated that the number of fins may be selected to suit any particular requirements.

The heat-conducting member 14 is made of a material having good thermal conductivity, preferably aluminum or an alloy thereof. The heat-conducting member 14 is advantageously formed with the fins 18 integral with the back portion 16, and preferably is extruded so that the heat-conducting member 14 is of one-piece construction. Extruding the heat-conducting member 14 allows the heat-conducting member 14 to be cut in any desired length from a longer extrusion, thus permitting various sizes of warmers having various capacities to be produced relatively easily. Making the heat-conducting member 14 of one-piece integral construction also facilitates good thermal conduction between the back portion 16 and the fins 18 and along the length and width of the heat-conducting member, thereby helping to assure uniformity in temperature throughout the heat-conducting member 14.

A heating element 24 is attached to the heat-conducting member 14 in heat-exchanging relationship therewith. The heating element 24 preferably is attached to the back portion 16 of the heat-conducting member 14. The heating element 24 preferably is an electrical resistance-type heating element, and more preferably is a flexible etched foil-type heating element which is adhesively attached to the back portion 16.

Thermal insulation 26 is applied to the rear surfaces of the heat-conducting member 14 and covering the heating element 24 in order to reduce thermal conduction from the heat-conducting member 14 to the housing 12 and to reduce heat loss through radiation and free convection on the rear side of the heat-conducting member 14. Additionally or alternatively, the housing 12 itself, or parts thereof, may be made of a thermally insulating material such as foamed plastic or the like.

The housing 12 includes a pair of end caps 13 which preferably are constructed of plastic, more preferably a thermally resistant and thermally insulating plastic such as a foamed plastic, as previously noted. The end caps 13 cover the opposite ends of the heat-conducting member 14 and also serve to support the warmer when it is placed on a horizontal surface. The housing 12 also includes a surround 15 which partially encloses the heat-conducting member 14 and covers the rear surfaces thereof. The surround 15 is preferably made of sheet metal, although other materials such as plastics may be used. It will be appreciated that the housing 12 may alternatively be constructed of one piece or a plurality of pieces, and in various configurations.

A temperature control unit 28 is connected with the heating element 24 for controlling operation thereof in order to maintain the temperature of the heat-conducting member 14 substantially constant at a selected value. The temperature control unit 28 preferably is an electronic control unit employing a temperature sensor 30 and programmed to operate the heating element 24 so as to keep the temperature measured by the temperature sensor 30 within a predetermined tolerance of the desired temperature. The temperature sensor 30 is preferably placed in thermally close-coupled relationship with the heat-conducting member 14 so that the measured temperature accurately reflects the actual temperature of the heat-conducting member 14.

Electrical power is supplied to the warmer 10 by a power cord 31. An on-off switch 32 and an indicator light 34 are provided on the housing 12 for supplying or interrupting electrical power to the heating element 24 and for indicating when the heating element 24 is powered, respectively.

FIG. 4 depicts another preferred embodiment of the invention in which the back portion 46 of the heat-conducting member 44 is generally L-shaped in the vertical plane (i.e., the plane normal to the transverse or length direction of the heat-conducting member 44). Various other configurations for the heat-conducting member may be used.

FIGS. 5 and 6 depict yet another preferred embodiment of the invention in which the housing 52 is formed in two parts which are pivotally interconnected so that the orientation of the fins may be selectively varied in accordance with the desires of the user. A first housing portion 53 contains the heat-conducting member 54 and the heating element and associated electrical components (not shown in FIGS. 5 and 6), and a second housing portion 57 comprises a stand or support which is adapted to support the first housing portion. The first portion 53 is pivotally connected to the second portion 57 via a transverse hinge 59. A locking mechanism 61 fixes the two portions in a selected orientation with respect to each other. Advantageously, the pivotal interconnection of the two housing portions permits selective variation of the angle that the fins 18 make with respect to horizontal from about 40° to about 60°. In the illustrated embodiment of FIGS. 5 and 6, the second portion 57 is depicted as a sheet metal stand which is hinged at its middle so that the upper part 57a may be rotated with respect to the lower part 57b. The lower part 57b is adapted to rest on a support surface, and the upper part 57a is adapted to engage the first housing portion 53. The locking mechanism 61 comprises the upper end of the upper part 57a in combination with a series of vertically spaced detents 58 in the first portion 53, the upper end of upper part 57a engaging selected ones of the detents 58 in order to fix the first portion 53 in a selected orientation with respect to the second portion 57. However, it will be appreciated that various types of pivotal connection devices and locking mechanisms may be used to achieve the purposes of the invention.

Where the warmer is to be used for warming bags always to the same temperature, the temperature control unit 28 may be preprogrammed with a fixed set point temperature. For instance, for bags containing polyol and isocyanate-containing precursors, it is advantageous to warm the bags to a temperature of about 120° F. to about 145° F., although the optimum temperature is dependent on the particular formulation of foamable composition, and therefore the control unit 28 may be preset with a suitable set point temperature to operate the heating element 24 so as to heat the bags to a selected temperature between about 120° F. and 145° F. Alternatively, the warmer may be provided with a temperature selection control to enable the user to selectively vary the set point temperature.

In use, bags may be loaded into the warmer when the warmer is either in a "cold" condition (i.e., at about room temperature) or a "preheated" condition (i.e., above room temperature, such as when the warmer has previously been used to warm a prior batch of bags). When the warmer is being used continuously to warm multiple batches of bags, the warmer may be left on continuously and warm bags may be removed from the warmer as needed and cold bags may be inserted as required to maintain an adequate supply of warm bags at all times, within the constraints imposed by the capacity of the warmer. The desired number of bags to be warmed are placed into the compartments 20 between the fins 18 in side-by-side fashion. The warmer is turned on (or left on, as the case may be), and the bags are left in the warmer for a sufficient time to insure that they reach the desired temperature, such as about 130° F., or at least until they reach a usable temperature, such as about 120° F. When a bag which has reached a usable or desired temperature is to be used, the user removes the bag from the warmer and grasps the bag as shown in FIG. 3. The user then removes the flexible label 62 which among other things serves to hold the free ends of the folded bag together to prevent the bag from being unfolded, and unfolds the bag into a flat configuration. The bag is then manipulated to cause mixing of the two precursor chemicals contained within the bag in order to initiate a foam-forming reaction in the bag. The bag 22 and its use are fully described in the aforementioned U.S. Pat. No. 5,899,325.

While the invention has been explained by reference to particular embodiments thereof, and while these embodiments have been described in considerable detail, the invention is not limited to the particular details of these embodiments. Modifications which are within the scope of the invention will readily occur to those of ordinary skill in the art. Accordingly, the scope of the invention including such modifications is to be determined by reference to the appended claims.

What is claimed is:

1. A warmer for bags containing a foamable composition, and comprising:

a heat-conducting member having a plurality of spaced-apart compartments for receiving bags, the heat-conducting member including an integral one-piece back portion having opposite ends and having a first surface forming bottoms of the compartments, the heat-conducting member further including a plurality of spaced-apart heat-conducting fins projecting from the first surface thereof, the compartments being defined between adjacent pairs of the fins with each compartment extending along a length of the back portion substantially from one end to the other end thereof; and an electrical resistance heating element attached directly to a second surface of the back portion on an opposite side thereof from the first surface, the heating element being in heat-exchanging relationship with the back portion of the heat-conducting member for heating the back portion such that heat is then conducted through the fins to the bags.

2. The warmer of claim 1, further comprising a housing partially enclosing the heat-conducting member and permitting access to the compartments for inserting bags into and removing bags from the compartments.

3. The warmer of claim 2 wherein the housing includes a first portion which contains the heat-conducting member and a second portion which is adapted to support the warmer, the first and second portions of the housing being pivotally interconnected to permit the orientation of the first portion to be varied relative to the second portion of the housing.

4. The warmer of claim 2 wherein the heat-conducting member has opposite ends between which each compartment extends, and wherein the housing includes a pair of end caps which cover the opposite ends of the heat-conducting member.

5. The warmer of claim 4 wherein the end caps are constructed of a thermally insulating material.

6. The warmer of claim 1 wherein the back portion and fins are integrally formed of one piece.

7. The warmer of claim 6 wherein the heat-conducting member is an extrusion.

8. The warmer of claim 6, further comprising thermal insulation covering the second side of the back portion opposite from the first side thereof.

9. The warmer of claim 6 wherein the back portion has a generally C-shaped cross-section normal to the length direction thereof.

10. The warmer of claim 6 wherein the back portion has a generally L-shaped cross-section normal to the length direction thereof.

11. The warmer of claim 6 wherein the back portion is substantially planar.

12. The warmer of claim 1 wherein the heating element comprises a flexible etched foil-type heating element.

13. The warmer of claim 1, further comprising a temperature control unit connected with the heating element for controlling the temperature of the heat-conducting member.

14. The warmer of claim 1 wherein the heat-conducting member has a length direction extending between the opposite ends of the back portion, and wherein the heat-conducting member has a cross-section normal to the length direction that is substantially non-varying along the length of the heat-conducting member.

\* \* \* \* \*

UNITED STATES PATENT AND TRADEMARK OFFICE
CERTIFICATE OF CORRECTION

PATENT NO.    : 5,986,239
DATED         : November 16, 1999
INVENTOR(S)   : Corrigan, III et al.

It is certified that error appears in the above-identified patent and that said Letters Patent is hereby corrected as shown below:

<u>Title page,</u>
References Cited, U.S. PATENT DOCUMENTS,
Line 6, "Gordon" should read -- Gordon, Jr. --;
After line 10, add
    -- 5,029,446    7/1991  Suzuki --;

References Cited, add
    -- FOREIGN PATENT DOCUMENTS,
      2,621,685    4/1989  France --.

Signed and Sealed this

Second Day of April, 2002

Attest:

JAMES E. ROGAN
*Attesting Officer*    *Director of the United States Patent and Trademark Office*